United States Patent

[11] 3,602,704

[72] Inventors Izrail Yakovlevich Akushsky
ulitsa Gerasima Kurina, 34, kv.26;
Davlet Islam Gireevich Juditsky, ulitsa 1 Yaroslavskaya, 21-9, kv.19, both of Moscow, U.S.S.R.

[21] Appl. No. 662,434
[22] Filed Aug. 22, 1967
[45] Patented Aug. 31, 1971

[54] APPARATUS FOR CORRECTING ERRORS IN A RESIDUE CODE SYSTEM
1 Claim, 1 Drawing Fig.

[52] U.S. Cl. .......... 235/153, 235/156
[51] Int. Cl. .......... G06f 11/10, G06f 7/36
[50] Field of Search .......... 235/153, 156

[56] References Cited

UNITED STATES PATENTS

| | | | |
|---|---|---|---|
| 3,227,865 | 1/1966 | Hoernes | 235/153 |
| 3,137,788 | 6/1964 | Froggatt | 235/153 |

OTHER REFERENCES

Day, E. C. et al., Rensec: Logical Design for a Residue-Number-System Digital Computer, In RCA Engineer, 9(2): p. 40–43, August-September, 1963, TK6540.R121.

*Primary Examiner*—Malcolm A. Morrison
*Assistant Examiner*—Stephen Dildine, Jr.
*Attorney*—Waters, Roditi, Schwartz & Nissen

ABSTRACT: A device is provided for correcting errors in the course of the transmission and arithmetical processing of information in digital computers employing a system of residual classes. The device comprises a first arithmetical unit of the computer in which signals corresponding to residues $\alpha_1, \alpha_2, ..., \alpha_n$ by the radices $P_1, P_2, ... P_n$ representing the number to be analyzed are fed to selected inputs of the computer, and a second arithmetical unit to whose inputs signals are fed corresponding to the residues $\alpha_{n+1}, \alpha_{n+2}$ by the excess radices $P_{n+1}$ and $P_{n+2}$. The inputs of a constant storage unit are connected to the outputs of the first arithmetical unit whereas the outputs of the storage unit are connected to other common inputs of both arithmetical units for successive conversion of the number to be analyzed to another number of the *n*th order, the latter being in the same numerical range with the number to be analyzed. An analyzing unit of the two last numbers for zero is connected at its inputs to the second arithmetical unit and at its outputs to the common inputs of both said arithmetical units for detecting an error and a correction number. Finally, a control unit is connected to the inputs of the constant storage unit, the second arithmetical unit and the analyzing unit.

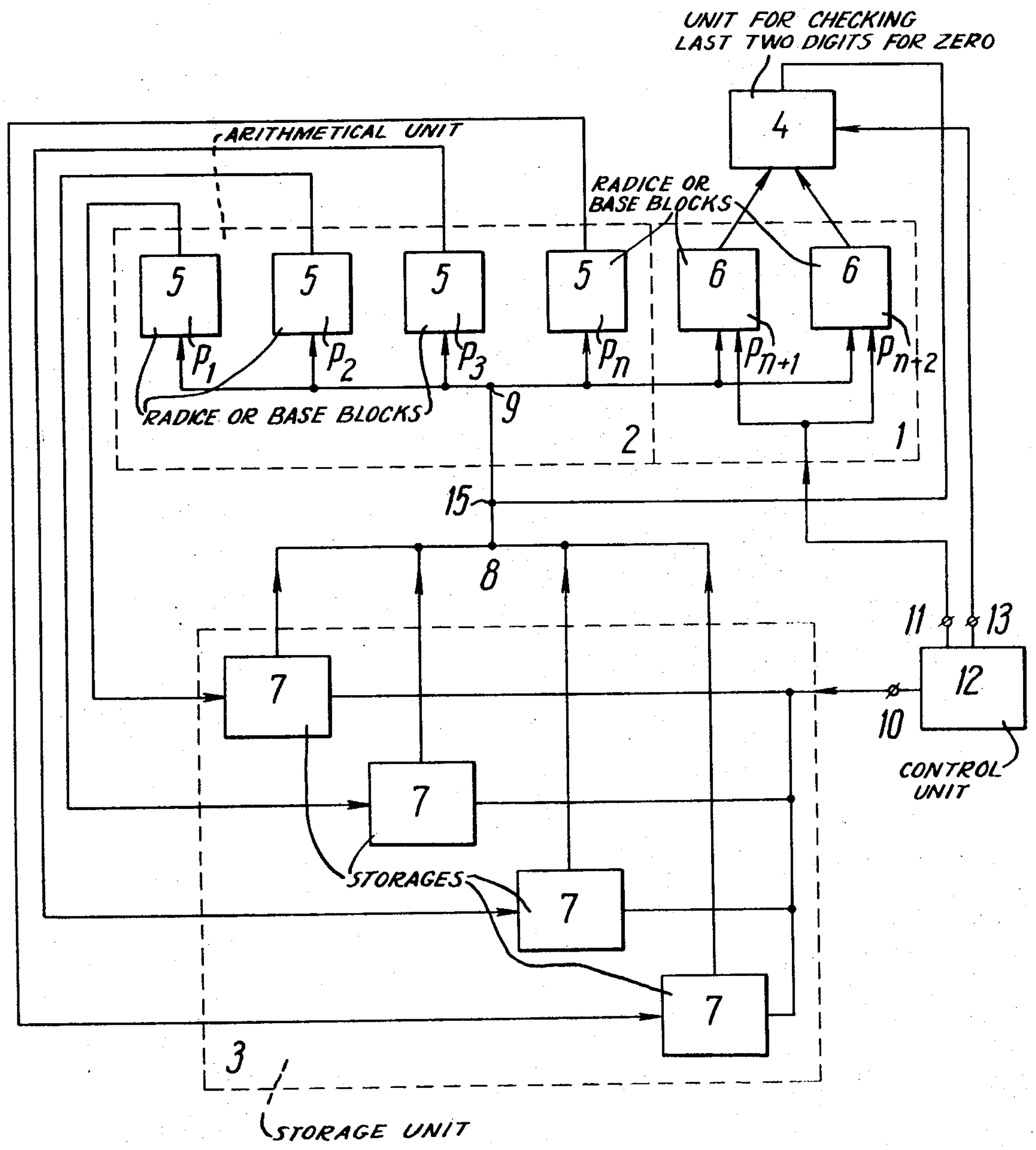
UNIT FOR CHECKING LAST TWO DIGITS FOR ZERO
ARITHMETICAL UNIT
RADICE OR BASE BLOCKS
RADICE OR BASE BLOCKS
CONTROL UNIT
STORAGES
STORAGE UNIT

APPARATUS FOR CORRECTING ERRORS IN A RESIDUE CODE SYSTEM

The present invention relates to the correction of errors in residue code systems.

Methods known heretofore for correcting errors in numbers are based, principally, on the fact that the numbers are accompanied by multidigit or modulus additional numbers representing the general characteristics of the initial numbers. (Cf. U.S. Pat. Nos. 2,969,912 and 2,919,854, class 235–153.) These methods are convenient for the transfer or transmission of numbers, but due to their nonarithmetical nature, they require a rather complicated equipment for being applicable when correcting errors which may arise when certain operations are performed in the arithmetic unit of the digital computer.

An object of the present invention is to eliminate the above disadvantages.

Another and more specific object of the invention is to provide a method for correcting errors in the course of the transmission and arithmetical processing of information in digital computers which employ a system of residual classes with redundant coding of information and a device for implementing such method.

In accordance with said and other objects the present invention resides in a method for correcting errors which consists in that two additional radices or bases $P_{n+1}$ and $P_{n+2}$ are introduced, said additional radices or bases being greater than any radix or base $P_1$, $P_2$...,$P_n$, of the working range and such that $P_{n+2}\cdot P_{n+1}\geq 3P_n\cdot P_{n1}$, numbers represented by their residues $\alpha_1, \alpha_2,..., \alpha_{n+1}, \alpha_{n+2}$ in the extended system of radices or bases $P_1, P_2,..., P_{n+1}, P_{n+2}$ are operated upon, the final result is checked or analyzed for the presence of an error, and the digit containing the error is found, for which purpose according to the first digit of the obtained number a constant is selected from a given set of constants, said constant comprising the number of digits equal to the number of the radices or bases in the system and being such that upon subtracting it from said number the first digit be zero; according to the second digit of the difference thus obtained the second constant is selected from the given set, such that upon subtracting it from the first difference zero be obtained in the second digit of said difference, the procedure being continued up to the *n*th digit, after which the last two digits of the system are analyzed and by the result of the analysis the value and place of the correction digit is unequivocally determined, the true digit being obtained by adding said correction digit to the erroneous one.

The device for implementing the method described above comprises an arithmetic unit for processing digits to the radices or bases $P_{n+1}$ and $P_{n+2}$ being introduced, said arithmetic unit being coupled to the arithmetic unit of the digital computer, a constant storage unit connected with said arithmetic units, a unit for checking two last digits of the number for zero coupled to the arithmetic unit of the computer and determining the location of the erroneous digit and also the correction digit, which is to be added to the erroneous digit to obtain the true digit of the number.

For a better understanding of the present invention given below is a description thereof, to be had in conjunction with the accompanying drawing in which the block diagram of the proposed device for correcting errors is represented.

In the invention proposed herein a method is disclosed for correcting errors in digital computers on the basis of nonpositional redundant codes in a system of residual classes both in the course of transfer or transmission and in the course of arithmetical processing of digital information.

Let us consider a system of residual classes with relatively prime radices or bases $$P_1<P_2<...<P_n \qquad (1)$$

In this system any integer A in the interval $(0,P)$, where $P=P_1P_2...P_n$ is represented in the form $$A=(\alpha_1, \alpha_2,..., \alpha_n), \qquad (2)$$

where $\alpha_i$ is the residue from the division of $A$ by the radix or base $P_i$.

Let us additionally introduce two radices or bases $P_{n+1}$ and $P_{n+2}$, mutually prime with any $P_i$ from (1) as well as with respect to each other and satisfying the condition $$P_{n+2}>P_{n+1}>P_n \qquad (3)$$

and let us represent numbers in this extended system $$A=(\alpha_1, \alpha_2,..., \alpha_n, \alpha_{n+1}, \alpha_{n+2}). \qquad (4)$$

This means that we shall represent numbers in the computer and perform operations upon numbers lying within a wider range $(0,P)$, where $$P=\rho P_{n+1}P_{n+2}$$

Since we consider the working range, i.e., the range within which there lie the numbers being treated and results of operations performed upon them, to be $(0,\rho)$, it is obvious, that if at any stage of processing it happens that $A>\rho$, then an error has taken place in the course of processing. We shall call numbers less than $\rho$ "proper" and those greater than $\rho$ "improper." We shall state without proof the following theorem 1 which concerns the distribution of the values of $A$ over various intervals of the range $(0,P)$.

Theorem 1

Let $A_{S_i}=(\alpha_1,..., \alpha_{i11}, S, \alpha_{i+1},..., \alpha_{n+2}) \qquad (6)$ denote a sequence $P_i$ of numbers in which the digits to all the radices or bases except $P_i$ are the same and the digit to the radix or base $P_i$ takes values $0,1,...,P_{i11}$.

Then within each of the intervals $$1_j=(j(P/P_i),(j+1)(P/P_i)) \quad j=0,1,...,P_{i11}$$

there is one number from this sequence.

Let us point out an important corollary which follows from this theorem 1.

Corollary

There exists only one value $S_i=\alpha_i$ such that the number $A$ lies in the interval $(0,P/P_i)$. Indeed, since in each of the intervals $1_i$ there is one number from the sequence $A_{S_i}$, one of them is sure to lie in the interval $1_0=(0,P/P_i)$.

The following theorem is essential for further reasoning.

Theorem 2

Let $P_1<P_2<...<P_n<P_{n+1}<P_{n+2}$ and let $A=(\alpha_1,.., \alpha_i,..., \alpha_{n+2})$ be a proper number.

Then number $A'$ $$A'=(\alpha_1\alpha_2,..., \alpha_i'\neq\alpha_i,..., \alpha_n, \alpha_{n+1}, \alpha_{n+2})$$

is improper.

Proof

The proper character of the number $A$ means that $$A<P/(P_{n+1}P_{n+2})$$

but since $$\frac{P}{P_i}\geq\frac{P}{P_{n+1}P_{n+2}},\quad A<\frac{P}{P_i}$$

all the more

Consequently, $A$ is in the interval $(0,P/P_i)$. As it was pointed out in the corollary to theorem 1, since $\alpha_i'\neq\alpha_i$ the number $A'$ cannot be in the interval $(0,P/P_i)$ and, in any case, $$A'>\frac{P}{P_i}>\frac{P}{P_{n+1}P_{n+2}}=\rho,$$

i.e. $A'$ is an improper number.

This theorem establishes an important fact, that any distortion of a digit to any radix or base converts the respective number into an improper one and, hence, the presence of an error may be detected. Moreover, it has been shown, that there exists one and only one value of this digit which may convert the improper number into the proper one.

Hence, if the presence of an error is detected, then in order to correct it only its location should be determined, i.e. which digit is erroneous. After that the correct digit is determined unequivocally.

Theorem 2 may be generalized as follows.

Theorem 3

Let $P_{j1}, P_{j2},...,P_{j\rho}$ be such $\rho$ from among the radices or bases of the system that $P_{j1},P_{j2}...\overline{P}_j=P<P_{n+1}P_{n+2}$. Then the number $\overline{A}$ in which digits to all these radices or bases or to some of them are erroneous, is improper. This theorem 3 immediately follows from theorem 2 if we regard $\overline{P}$ as one radix or base of the system. Then the condition under which theorem 2 holds is satisfied and the number in which a digit to the radix or base $\overline{P}$ is erroneous, is improper.

An error in the digit to the radix or base $\bar{P}$ may affect digits to any number of radices or bases constituting $\bar{P}$.

Since each of the introduced check radices or bases is chosen to be greater than any radix or base within the working range, then whatever be the two radices or bases of the extended system $P_i$ and $P_j$, $$P_i \cdot P_j \lesssim P_{n+1} \cdot P_{n+2}$$

will always hold.

Therefore, a number with a double error, i.e. with two erroneous digits will always be improper and hence the presence of such an error may always be detected.

Thus, in order to detect the presence or establish the absence of an error in the number $A$ it should be compared with the number $\rho$. If it turns out that $A \gtrsim \rho$, then an error has taken place, at least in one digit.

As a basic method to realize in residual classes the detection of an error in the number $A$, a method should be adopted which we shall here and hereafter call "the method of nullevization" and which consists in successive passing from the number $\tilde{A}$ over to the number $\tilde{A}_1$ in which the digit to the radix or base $P_1$ is equal to zero, then over to $\tilde{A}_2$ in which not only said digit to the base $P_1$ is equal to zero, but also the digit to the radix or base $P_2$, and so on.

The nullevization is attained by means of successive subtractions from $\tilde{A}$, $\tilde{A}_1$, $\tilde{A}_2$ etc. of corresponding constants selected from the following set stored in the digital computer.

(1)

$$C_1^{t_{11}} = (t_{11}, t_{12}, \ldots, t_{1,\, n+1}, t_{1,\, n+2}) t_{11} = 1, 2, \ldots, P_1 - 1$$

(2)

$$C_2^{t_{22}} = (0, t_{22}, \ldots, t_{2,\, n+1}, t_{2,\, n+2}) t_{22} = 1, 2, \ldots, P_2 - 1$$

.
.
.

($n$)

$$C_n^{t_{nn}} = 0, 0, \ldots, 0, t_{nn}, t_{n,\, n+1}, t_{n,\, n+2}) t_{nn} = 1, 2, \ldots, P_n - 1$$

The process of nullevization for establishing the very fact of the presence of an error, i.e. checking of the number $\tilde{A} = (\alpha_1, \alpha_2, \ldots, \alpha_{n+1}, \alpha_{n+2})$ consists of the following steps:

Step 1. Computing of $\tilde{A}_1 = \tilde{A} - C_1^{\alpha'} = (0, S_2', t_{11} \ldots, S'_{n+1}, S'_{n+2})$, where $C_1^{\alpha}$ is a constant from the set $C_1$, in which $t_{11} = \alpha_1$.

Step 2. Computing of $\tilde{A}_2 = \tilde{A}_1 - C_2^{S_2'} = (0, 0, S_3^2 \ldots S^2_{n+1}, S^2_{n+2})$, where $C_2^{S_2'}$ is a constant from the set $C_2^{t_{22}}$, in which $t_{22} = S_2'$.

Step N. Computing of $\tilde{A}_n = \tilde{A}_{n-1} - C_n = (0, 0, \ldots, 0, S^n_{n+1}, S^n_{n+2})$, where $C_n$ is a constant from the set $C_n^{t_{nn}}$, in which $t_{nn} = S_n^{n11}$ If in the number $\tilde{A}_n$ thus obtained the digits $S^n_{n+1}$, $S^n_{n+2}$ are equal to zero, then the number $\tilde{A}$ is proper; if otherwise, i.e., if at least one of these digits differs from zero, then the number $\tilde{A}$ is improper.

Note: If, when carrying out the nullevization, a number has been obtained at step i which contains a zero digit to the radix or base $P_{i+1}$ as well, then step i+1 should be omitted and the following step i+2 is to be performed.

The set of constants for checking the presence or establishing the absence of errors comprises $P_1 + P_2 + \ldots + P_n - n$ constants.

For determining the location and value of a possible error the following method may be employed. If the system of radices or bases is selected so that there holds $$P_{n+1} P_{n+2} \geq 3 (P_{n11}) (P_n)$$

then there is a one-to-one correspondence between the combination of digits $S^n_{n+1}$, $S^n_{n+2}$ and the value and location of the error.

Indeed, let there take place an error $\Delta\alpha_i$ in the digit $\alpha_i$ to the radix or base $P_i$.

Then the number is no longer proper and happens to be either in the interval $(j\rho, (j+1\rho)$, or in the interval $((j+1)\rho, (j+2)\rho)$ depending on the value of the number, where the number of the interval $j$ is determined as $$j = \left[ \frac{\Delta\alpha i^m i P_{n+1} P_{n+2}}{P_i} \right] + 1$$

being determinal by the condition $m_i(P/P_i)(\text{mod } P_i) = 1$. Hence, in order that the error $\Delta\alpha_i$ in the digit to the radix or base $P_i$ should not be in the interval with the same number as the error $\Delta\alpha_j$ in the digit to the radix or base $P_j$, where $i.j \equiv 1, 2, \ldots, n$, the relation $$\left[ \frac{\Delta\alpha i^m i P_{n+1} P_{n+2}}{P_i} - \frac{\Delta\alpha i^m j P_{n+1} P_{n+2}}{P_j} \right] \geq 2$$

should hold, which is satisfied, if $P_{n+1} P_{n+2} \gtrsim 3 P_i P_j$.

For this relation to hold for any radix or base, the relation $$P_{n+1} P_{n+2} \gtrsim 3 P_{n11} P_n$$

is to hold, and, consequently, by the known values of $S^n_{n+1}$, $S^n_{n+}$ there are also known the value $\Delta\alpha_i$ of the error and its location, viz, the digit number modules $P_i$.

Let us consider an example to illustrate the above-described method of error correction.

Let there be a system of radices or bases $P_1=2, P_2=3, P_3=5, P_4=7, P_5=11, P_6=13$, for which $m_1=1, m_2=2, m_3=1, m_4=6, m_5=6, m_6=3$.

The set of nullevization constants will be as follows:

$C_1' = (1,1,1,1,1,1,);$
$C_2' = (0,1,4,4,4,4);$
$C_3^1 = (0,0,1,6,6,6);$
$C_3^3 = (0,0,3,4,7,5);$
$C_4' = (0,0,0,1,10,3);$
$C_4^3 = (0,0,0,3,7,7,);$
$C_4^5 = (0,0,0,5,4,11);$
$C_4^6 = (0,0,0,6,2,12);$
$C_2^2 = (0,2,2,2,2,2);$
$C_3^2 = (0,0,2,5,1,12);$
$C_3^4 = (0,0,4,3,2,11);$
$C_4^2 = (0,0,0,2,8,4);$
$C_4^4 = (0,0,0,4,5,8).$

Let us make up a table of correspondence between the values of possible errors and the values of $S^n_{n+1}$ and $S^n_{n+2}$

POSSIBLE COMBINATIONS OF CHECK RADICES OR BASES

| Radices or bases | Errors | Check radices or bases | | | |
|---|---|---|---|---|---|
| | | $S^n_{n+1}$ | $S^n_{n+2}$ | $S^n_{n+1}$ | $S^n_{n+2}$ |
| 1 | 2 | 3 | 4 | 5 | 6 |
| $P_1=2$ | $\Delta\alpha_1=1$ | 5 | 12 | 6 | 1 |
| $P_2=3$ | $\Delta\alpha_2=1$ | 7 | 8 | 8 | 10 |
| | $\Delta\alpha_2=2$ | 3 | 3 | 4 | 5 |
| $P_3=5$ | $\Delta\alpha_3=1$ | 6 | 4 | 7 | 6 |
| | $\Delta\alpha_3=2$ | 2 | 10 | 3 | 12 |
| | $\Delta\alpha_3=3$ | 8 | 1 | 9 | 3 |
| | $\Delta\alpha_3=4$ | 4 | 7 | 5 | 9 |
| $P_4=7$ | $\Delta\alpha_4=1$ | 1 | 10 | 2 | 12 |
| | $\Delta\alpha_4=2$ | 3 | 9 | 4 | 11 |
| | $\Delta\alpha_4=3$ | 4 | 6 | 5 | 8 |
| | $\Delta\alpha_4=4$ | 6 | 5 | 7 | 7 |
| | $\Delta\alpha_4=5$ | 7 | 2 | 8 | 4 |
| | $\Delta\alpha_4=6$ | 9 | 1 | 10 | 3 |
| $P_5=11$ | $\Delta\alpha_5=1$ | 1 | 0 | 1 | 0 |
| | $\Delta\alpha_5=2$ | 2 | 0 | 2 | 0 |
| | $\Delta\alpha_5=3$ | 3 | 0 | 3 | 0 |
| | $\Delta\alpha_5=4$ | 4 | 0 | 4 | 0 |
| | $\Delta\alpha_5=5$ | 5 | 0 | 5 | 0 |
| | $\Delta\alpha_5=6$ | 6 | 0 | 6 | 0 |
| | $\Delta\alpha_5=7$ | 7 | 0 | 7 | 0 |
| | $\Delta\alpha_5=8$ | 8 | 0 | 8 | 0 |
| | $\Delta\alpha_5=9$ | | | | |

POSSIBLE COMBINATIONS OF CHECK RADICES OR BASES
Continued

| Radices or bases | Errors | Check radices or bases | | | |
|---|---|---|---|---|---|
| | | $S^n_{n+1}$ | $S^n_{n+2}$ | $S^n_{n+1}$ | $S^n_{n+2}$ |
| 1 | 2 | 3 | 4 | 5 | 6 |
| | | 9 | 0 | 9 | 0 |
| | $\Delta\alpha_5=10$ | 10 | 0 | 10 | 0 |
| $P_6=13$ | $\Delta\alpha_6=1$ | 0 | 1 | 0 | 1 |
| | $\Delta\alpha_6=2$ | 0 | 2 | 0 | 2 |
| | $\Delta\alpha_6=3$ | 0 | 3 | 0 | 3 |
| | $\Delta\alpha_6=4$ | 0 | 4 | 0 | 4 |
| | $\Delta\alpha_6=5$ | 0 | 5 | 0 | 5 |
| | $\Delta\alpha_6=6$ | 0 | 6 | 0 | 6 |
| | $\Delta\alpha_6=7$ | 0 | 7 | 0 | 7 |
| | $\Delta\alpha_6=8$ | 0 | 8 | 0 | 8 |
| | $\Delta\alpha_6=9$ | 0 | 9 | 0 | 9 |
| | $\Delta\alpha_6=10$ | 0 | 10 | 0 | 10 |
| | $\Delta\alpha_6=11$ | 0 | 11 | 0 | 11 |
| | $\Delta\alpha_6=12$ | 0 | 12 | 0 | 12 |

As can be seen from the table, there is an unequivocal correspondence between the result of nullevization and the location and value of the error.

EXAMPLE 1

Check and correct number $\tilde{A}=(1,2,2,3,1,4)$.

First let us nullevize the number $\tilde{A}$.

Step. 1. $\tilde{A}-(1,1,1,1,1,1,)=(0,1,1,2,0,3)$.

Step. 2. $(0,1,1,2,0,3)-(0,1,4,4,4,4)=(0,0,2,5,7,12)$.

Step. 3. $(0,0,2,5,7,12)-(0,0,2,5,1,12)=(0,0,0,0,6,0)$.

Hence, the number $\tilde{A}$ is improper and in it $S^n_{n+1}=6$, $S^n_{n+2}=0$. Now, referring to the table, we determine that there takes place an error $\Delta\alpha_5=6$ to the radix or base $P_5=11$.

Now let us correct the error:

$A_{true}+(0,0,0,0,6,0)=\tilde{A}$.

Hence, $A_{true}=\tilde{A}-(0,0,0,0,6,0)=(1,2,2,3,6,4)$.

Indeed, $(1,2,2,3,6,4)$ is a proper number.

EXAMPLE 2

Check and correct number $\tilde{A}=(1,1,5,5,0,5)$.

Let us nullevize the number $\tilde{A}$.

Step 1. $\tilde{A}-(1,1,1,1,1,1,)=(0,0,4,4,10,4)$.

Step 2. $(0,0,4,4,10,4)-(0,0,4,3,2,11)=(0,0,0,1,8,6)$

Step 3. $(0,0,0,1,8,6)-(0,0,0,1,10,3)=(0,0,0,0,9,3)$.

Then, referring to the table, we determine that there is an error, viz, $\Delta\alpha_3=3$ in the digit to the radix or base $\rho_3$ and correct the error:

$A_{true}=\tilde{A}-(0,0,3,0,0,0)=(1,1,2,5,0,5)$.

Let us consider the block diagram of the device which realizes the error-correcting method disclosed above.

The device comprises arithmetic unit 1 for processing digits to the introduced redundant radices or bases $P_{n+1}$ and $P_{n+2}$ coupled to arithmetic unit 2 of the digital computer, constant storage unit 3 connected with the arithmetic units 1 and 2, unit 4 for checking two last digits for zero, which is coupled to the arithmetic unit 1 and serves to determine the location of the erroneous digit and also the correction digit to be added to obtain the true digit of the number.

The arithmetic units 1 and 2 consist of elementary arithmetic blocks 5 and 6. The number of the blocks 5 is chosen to correspond to the number of the employed radices or bases $P_i$ of the working range.

According to digits $\alpha_1,\ldots,\alpha_n$ nullevization constants are selected successively from storages 7 of the unit 3. The output 8 of this unit is coupled to the input 9 of the units 1 and 2.

The proposed device operates as follows. The number to be analyzed is fed into the arithmetic units 1, 2 and, via the input 9, to the input registers of the elementary blocks 5. According to the address determined by the number digit to the radix or base $P_1$ the first nullevization constant is selected from the constant storage unit 3 and subtracted from the contents of the arithmetic unit. According to the value of the number digit to the radix or base $P_2$ obtained by this procedure, a successive nullevization constant is selected from the constant storage unit 3 and subtracted from the difference obtained in the arithmetic unit.

Said procedure having been carried out in times according to control signals arriving via terminals 10 and 11 of control unit 12, a completely nullevized number is obtained. In the elementary blocks 6 values $S^n_{n+1}$ and $S^n_{n+2}$ are formed. Control signals, via terminal 13 of the control unit 12, effect the selection from the unit 4, according to the values of $S^n_{n+1}$ and $S^n_{n+}$of the required correction value with the indication of the location of the digit to be corrected and, via input 15 sum it up with the corresponding digit of the initial number stored in the arithmetic unit 2.

What is claimed is:

1. A device for correcting errors in the course of the transmission and arithmetical processing of information in digital computers employing a system of residual classes comprising a first arithmetical unit of the computer, in which signals corresponding to residues $\alpha_1, \alpha_2,\ldots \alpha_n$ by the radices $P_1, P_2,\ldots P_n$ representing the number to be analyzed are fed to selected inputs of said first arithmetical unit; a second arithmetical unit to whose inputs signals are fed corresponding to the residues $\alpha_{n+1}$, $\alpha_{n+2}$ by the excess radices $P_{n+1}$ and $P_{n+2}$; a constant storage unit whose inputs are connected to the outputs of the first arithmetical unit whereas the outputs are connected to other common inputs of both said arithmetical units for successive conversion of the number to be analyzed to another number of the $n$th order, the latter being in the same numerical range with the number to be analyzed; an analyzing unit of the two last numbers for zero connected at its inputs to the second arithmetical unit and at its outputs to the common inputs of both said arithmetical units for detecting an error and a correction number; and a control unit connected to the inputs of said constant storage unit, said second arithmetical unit and said analyzing unit.